(12) United States Patent
Tsuda (10) Patent No.: US 9,555,477 B2
(45) Date of Patent: Jan. 31, 2017

(54) HOLDER AND CUTTING TOOL

(71) Applicant: KYOCERA Corporation, Kyoto-shi, Kyoto (JP)

(72) Inventor: Yuichi Tsuda, Satsumasendai (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 98 days.

(21) Appl. No.: 14/373,639

(22) PCT Filed: Jan. 30, 2013

(86) PCT No.: PCT/JP2013/052116
§ 371 (c)(1),
(2) Date: Jul. 22, 2014

(87) PCT Pub. No.: WO2013/115284
PCT Pub. Date: Aug. 8, 2013

(65) Prior Publication Data
US 2015/0030400 A1    Jan. 29, 2015

(30) Foreign Application Priority Data

Jan. 30, 2012   (JP) ................................ 2012-016750
Nov. 29, 2012   (JP) ................................ 2012-261182

(51) Int. Cl.
*B23B 27/04*     (2006.01)
*B23B 27/16*     (2006.01)
*B23B 29/04*     (2006.01)

(52) U.S. Cl.
CPC ......... *B23B 27/1625* (2013.01); *B23B 27/045* (2013.01); *B23B 29/043* (2013.01);
(Continued)

(58) Field of Classification Search
CPC ............. B23B 2205/02; B23B 2205/12; B23B 27/045; B23B 27/1625; B23B 27/04; B23B 29/043; B23B 2200/201; B23B 2220/126; Y10T 407/22; Y10T 407/2282
(Continued)

(56) References Cited

U.S. PATENT DOCUMENTS 3,844,008  A  * 10/1974  Sletten ................... B23B 27/04
                                                   407/101
4,801,224  A  *  1/1989  Pettersson ............... B23B 27/04
                                                   407/110
(Continued)

FOREIGN PATENT DOCUMENTS

EP    1671725 A1   6/2006
EP    2208563 A1   7/2010
(Continued)

OTHER PUBLICATIONS

European Search Report based on Application No. EP13 74 3692 (6 Pages) dated Aug. 13, 2015 (Reference Purpose Only).
(Continued)

*Primary Examiner* — Daniel Howell
*Assistant Examiner* — Nicole N Ramos (57) ABSTRACT

A holder for grooving work includes a shank portion, and a head portion located on an end portion thereof. The head portion includes an insert attaching space, an upper and lower respectively located above and below the insert attaching space, a slit extending backward from the insert attaching space, an upper and a lower jaw connecting portions divided by the slit, an upper clamp surface on the upper jaw and a lower clamp surface on the lower jaw opposed to the insert attaching space. A column-shaped groove is connected to the deepest end of the slit. The column-shaped groove is formed to reduce the thickness of the upper jaw connecting portion, and extends from the lateral face on the side of the insert attaching space halfway (Continued)

along the deepest end of the slit toward the opposite lateral face. Upon attaching the insert to the holder the cutting tool is obtained.

14 Claims, 7 Drawing Sheets

(52) U.S. Cl.
CPC ........... *B23B 27/04* (2013.01); *B23B 2205/02* (2013.01); *B23B 2205/12* (2013.01); *Y10T 407/22* (2015.01); *Y10T 407/2282* (2015.01); *Y10T 407/2286* (2015.01); *Y10T 407/2288* (2015.01); *Y10T 407/25* (2015.01)

(58) Field of Classification Search
USPC .................... 407/109–111, 91, 113, 116–117
See application file for complete search history.

(56) References Cited

U.S. PATENT DOCUMENTS

| | | | | |
|---|---|---|---|---|
| 5,288,180 A * | 2/1994 | Hedlund | ................. | B23B 27/04 407/101 |
| 5,921,724 A * | 7/1999 | Erickson | ................. | B23B 27/04 407/109 |
| 5,993,118 A * | 11/1999 | Brask | .................... | B23B 27/04 407/108 |
| 6,010,281 A | 1/2000 | Coutat et al. | | |
| 6,244,790 B1 * | 6/2001 | Kingdom | .............. | B23B 27/045 407/108 |
| 6,334,742 B1 * | 1/2002 | Shiraiwa | ................. | B23B 27/04 407/107 |
| 6,679,657 B2 * | 1/2004 | Shimomura | ........... | B23B 29/04 407/107 |
| 8,622,662 B2 * | 1/2014 | Heckel | .................... | B23B 51/00 407/110 |
| 2008/0003068 A1 * | 1/2008 | Nagaya | ................. | B23B 29/043 407/110 |
| 2008/0286057 A1 * | 11/2008 | Nagaya | ................... | B23B 27/04 407/110 |
| 2010/0158622 A1 | 6/2010 | Kaufmann | | |
| 2012/0260778 A1 * | 10/2012 | Uno | ...................... | B23B 29/043 82/1.11 |

FOREIGN PATENT DOCUMENTS

| | | |
|---|---|---|
| JP | 2001515794 A | 9/2001 |
| JP | 2003245805 A | 9/2003 |
| JP | 2006263846 A | 10/2006 |
| JP | 2007069291 A | 3/2007 |
| JP | 2010513033 A | 4/2010 |
| JP | 2011005626 A | 1/2011 |
| WO | WO 2010072206 A1 * | 7/2010 ............. B23B 51/00 |

OTHER PUBLICATIONS

International Search Report mailed Mar. 12, 2013 in PCT Application No. PCT/JP2013/052116, filed Jan. 30, 2013, 2 pages.

* cited by examiner

HOLDER AND CUTTING TOOL

RELATED APPLICATIONS

The present application is a national stage entry according to 35 U.S.C. §371 of PCT application No.: PCT/JP2013/052116 filed on Jan. 30, 2013, which claims priority from Japanese application Nos.: 2012-016750 filed on Jan. 30, 2012, and 2012-261182 filed on Nov. 29, 2012, and is incorporated herein by reference in its entirety.

TECHNICAL FIELD

The present invention relates to a holder to be used for grooving work and cut-off work, and to a cutting tool composed of the holder and an insert attached thereto for processing a work material.

BACKGROUND ART

To fasten a cutting insert in a throwaway cutting tool for performing grooving work and cut-off work, generally the insert is held between an upper jaw and a lower jaw, respectively provided at an upper and a lower position of a slit formed in the front end portion of a holder, and the slit is tightened with a screw so as to fasten the insert with the pressure. According to Patent Literature (PTL) 1 for example, a V-shaped or wave-shaped recessed groove is formed on each of the upper and lower faces of the insert, and a V-shaped or wave-shaped projection that fits in the recessed groove is formed on each of the upper jaw and the lower jaw of the holder, so that the insert is attached to the holder with the projection fitted in the recessed groove. Such a configuration increases the binding force.

With the mentioned binding method, the screw is located at a central portion of the upper jaw with which the screw is to be engaged, and the screw is tightened so as to warp the upper jaw, and therefore the end portions of the upper jaw are bent upward with respect to the bottom portion corresponding to the central portion where the screw is tightened. However, the insert is attached to either end portion of the holder in the width direction thereof, and hence the insert is downwardly pressed by the upper jaw and also subjected to a force exerted outward in the width direction of the holder, when the screw is tightened. Accordingly, the insert may tilt outward in the width direction of the holder, or may even fall off out of the holder.

To prevent the insert from tilting outward, PTL 2 proposes a holder in which the terminal length of the slit is set such that the side on which the insert is attached becomes longer than the other end, in other words the terminal end of the slit is formed to be oblique such that the side on which the insert is attached is located on the rear side and the other end is located on the front side.

CITATION LIST

Patent Literature

PTL 1: Japanese Unexamined Patent Application Publication (Translation of PCT Application) No. 2001-515794
PTL 2: Japanese Unexamined Patent Application Publication No. 2006-263846

SUMMARY OF INVENTION

Technical Problem

With the holder according to PTL 2, however, the rigidity of the holder as a whole including the upper jaw and the lower jaw declines, and the holder may chatter while performing the cutting work with the insert attached. In addition, to manufacture the holder according to PTL 2, the slit has to be obliquely formed with respect to the longitudinal direction of the holder, which makes it difficult to process a plurality of holders aligned in a row.

Solution to Problem

The present invention provides a holder including a generally bar-shaped shank portion and a head portion located on a front end portion of the shank portion and integrally formed therewith.

The head portion includes an insert attaching space provided on a lateral face of a front end portion, an upper jaw and a lower jaw respectively located above and below the insert attaching space, a slit extending backward from the insert attaching space, an upper jaw connecting portion and a lower jaw connecting portion divided by the slit, an upper clamp surface of the upper jaw opposed to the insert attaching space, and a lower clamp surface of the lower jaw opposed to the insert attaching space.

A groove is connected to the slit at a deepest end thereof. The groove is located such that a thickness of the holder between an upper face and the groove becomes thinner than a thickness of the holder between the upper face and the slit, and extends from the lateral face on the side of the insert attaching space toward the lateral face opposite to the lateral face on the side of the insert attaching space so as not to reach the opposite lateral face.

Advantageous Effects of Invention

In the holder and the cutting tool according to the present invention, the groove that reduces the thickness of the holder from the upper face is connected to the deepest end of the slit, and the groove extends from the lateral face on the side of the insert attaching space halfway toward the opposite lateral face, i.e., is not formed throughout the holder as far as the lateral face opposite to the lateral face on the side of the insert attaching space. Accordingly, the upper jaw can be deformed so as to prevent the insert from tilting outward. Therefore, when the insert is held between the lower jaw and the upper jaw, the insert can be prevented from tilting outward, and firmly fastened. Further, since the groove is formed so as not to penetrate as far as the lateral face opposite to the lateral face on the side of the insert attaching space, the rigidity of the holder is increased so as to suppress chattering. Consequently, the holder can effectively prevent chattering while performing the cutting work with the insert attached.

BRIEF DESCRIPTION OF DRAWINGS

FIG. 2A is a front view from the front end portion, FIG. 2B is a side view from the opposite side of an insert attaching space (B-side in FIG. 2A)

FIGS. 3A and 3B are schematic drawings of the shape of a portion R at the deepest end of a slit where a groove is not formed in the cutting tool shown in FIGS. 1A and 1B, FIG.

3A showing a curved surface formed at the same level as the lower face of an upper jaw, and FIG. 3B showing the curved surface formed to a position lower than the lower face of the upper jaw.

DESCRIPTION OF EMBODIMENTS

FIGS. 1A, 1B and FIGS. 2A to 2C illustrate a preferred embodiment of the present invention. A cutting tool according to the preferred embodiment will be described with reference to FIGS. 1A, 1B and FIGS. 2A to 2C.

A throwaway cutting tool (hereinafter, simply cutting tool) 1 shown in FIGS. 1A, 1B and FIGS. 2A to 2C, including a holder 2 and an insert 30 attached thereto according to this embodiment, is suitably applicable to grooving work and cut-off work. The cutting tool 1 includes a generally bar-shaped shank portion 3, and a head portion 4 located on a front end portion of the shank portion 3 and integrally formed therewith. The head portion 4 includes an insert attaching space 5 provided on a lateral face (A-side) of the front end portion, an upper jaw 7 and a lower jaw 8 respectively located above and below the insert attaching space 5, and a slit 9 extending backward from the insert attaching space 5. The head portion 4 also includes an upper jaw connecting portion 11 and a lower jaw connecting portion 12 divided by the slit 9. An upper jaw fixing portion 10 is provided on the other side of the upper jaw 7 (B-side), and an upper jaw fixing portion 14 is provided on the other side of the lower jaw 8 (B-side). The upper jaw 7, the upper jaw fixing portion 10, and the upper jaw connecting portion 11 are connected to each other, and the lower jaw 8, the lower jaw fixing portion 14, and the lower jaw connecting portion 12 are connected to each other.

The upper jaw fixing portion 10 includes a through hole 15 in which a screw 13 is to be inserted, and the lower jaw connecting portion 12 includes a screw hole (not shown) in which the screw 13 is engaged. The upper jaw 7 includes an upper clamp surface 18 formed on the lower face, and the lower jaw 8 includes a lower clamp surface 19 formed on the upper face. Upon inserting the screw 13 in the through hole 15 of the upper jaw fixing portion 10 and engaging the screw 13 with the screw hole of the lower jaw connecting portion 12, the upper clamp surface 18 of the upper jaw 7 and the lower clamp surface 19 of the lower jaw 8 press the insert 30 placed in the insert attaching space 5. Here, the insert 30 is attached such that the blade portion 31 is exposed on the front end portion and the outer side of the insert attaching space 5.

A column-shaped groove 20 formed in a direction perpendicular to the longitudinal direction of the holder 2, i.e., in the width direction of the shank portion 3, is connected to the deepest end of the slit 9. The column-shaped groove 20 is formed so as to reduce the thickness of the upper jaw connecting portion 11, and extends from the lateral face on the side of the insert attaching space 5 (A-side) toward the opposite lateral face on the B-side in the direction perpendicular to the longitudinal direction of the holder 2, but only halfway along the deepest end of the slit 9, so as not to reach the opposite side.

Figure 1A:
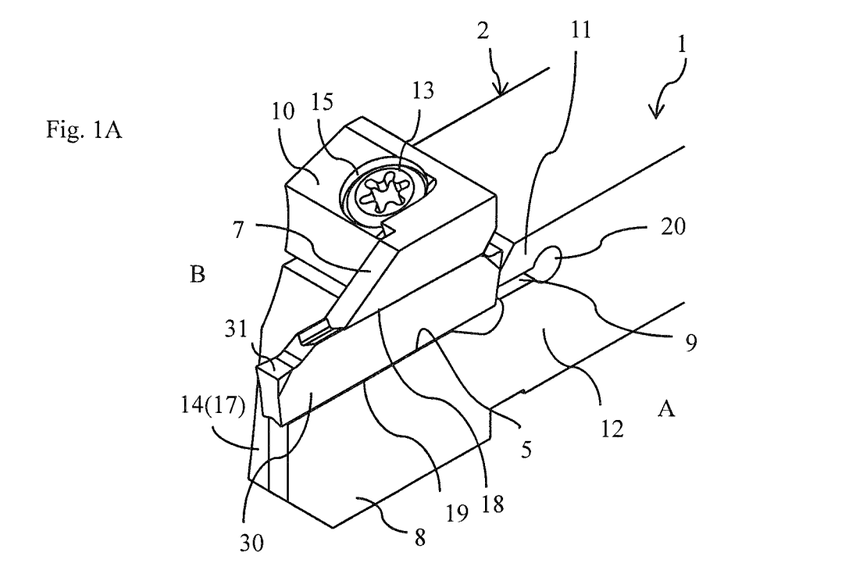
FIG. 1A is a perspective view and FIG. 1B is a plan view, respectively showing a cutting tool composed of a holder and an insert attached thereto, according to a preferred embodiment of the present invention.
Figure 1B:
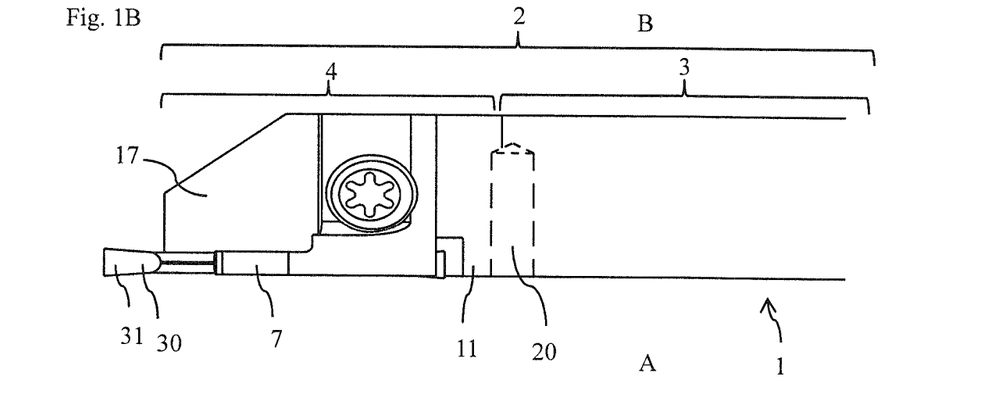
Figure 2A:
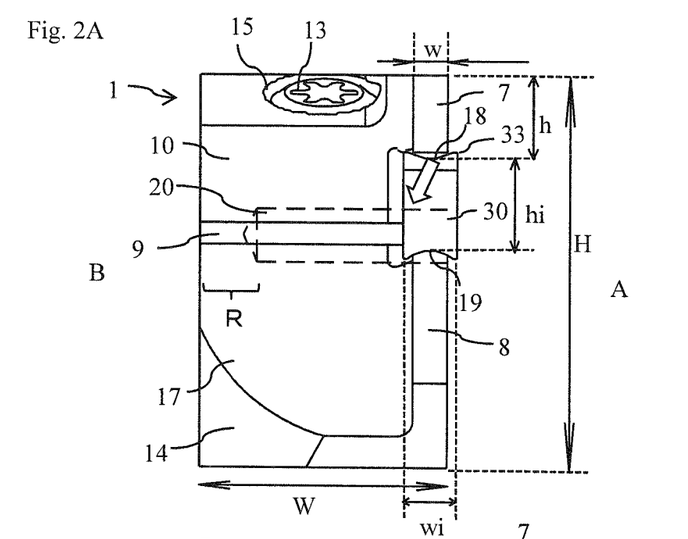

With the foregoing configuration, upon tightening the upper jaw connecting portion 11 with the screw 13 the upper jaw 7 presses the insert 30 downward and toward the B-side opposite to the A-side (in the direction of resultant vector of downward direction and direction toward B-side), as indicated by an arrow in FIG. 2A. Accordingly, the insert 30 can be prevented from tilting to the A-side, i.e., to the outer side where the blade portion 31 of the insert 30 is located, thus to be firmly fastened. Further, since the column-shaped groove 20 is formed so as not to penetrate as far as the lateral face on the B-side opposite to the insert attaching space 5, the rigidity of the holder 2 is increased so as to suppress chattering. Consequently, the holder 2 can effectively prevent chattering while performing the cutting work with the insert 30 attached.

Although the screw 13 is inevitably located on the B-side with respect to the upper jaw 7, it is preferable to locate the screw 13 at a position as close as possible to the A-side, i.e., adjacent to the upper jaw 7, in order to apply greater binding force to the insert 30. In other words, the terminal end of the column-shaped groove 20 is located on the B-side with respect to the center of the through hole 15 in the upper jaw connecting portion 11. For example, the center of the through hole 15 may be set at a position corresponding to 45 to 80% of the length of the column-shaped groove 20, more specifically at the position of 45 to 80% of the length of the column-shaped groove 20 from the opening thereof on the side of the lateral face on the A-side. Such a configuration allows the insert 30 to be firmly fastened. In addition, the screw hole in the lower jaw connecting portion 12 is slightly shifted to the B-side with respect to the through hole 15. Accordingly, the screw 13 is decentered when being tightened, so as to press the upper jaw 7 toward the B-side opposite to the A-side with a greater force.

Here, setting the length of the column-shaped groove 20 to 50 to 75% of the width of the holder 2 in a front view thereof effectively prevents the insert 30 from tilting outward. In this case, further, the rigidity of the holder 2 can be increased and chattering of the insert can be effectively suppressed.

In place of the column-shaped groove 20 according to this embodiment, the groove may be formed in different shapes such as an elliptical column shape, a polygonal column shape, a conical shape, and a polygonal conical shape. In addition, the column-shaped groove 20 according to this embodiment extends in the direction perpendicular to the longitudinal direction of the holder 2 from the front end portion to the rear end portion, in a plan view of the holder 2. In other words, the column-shaped groove 20 extends from the lateral face on the side of the insert attaching space 5 (A-side) toward the opposite B-side, in the direction perpendicular to the longitudinal direction of the holder 2. Such a configuration provides sufficient rigidity to the entirety of the holder including the upper jaw and the lower jaw, and allows a plurality of holders aligned in a row to be processed in the manufacturing process of the holder 2. The configuration of the column-shaped groove 20 is not limited to the above, but may be formed, for example, so as to obliquely extend deviating from the direction perpendicular to the longitudinal direction of the holder 2. In the case where the column-shaped groove 20 is obliquely formed, it is preferable that the column-shaped groove 20 is inclined to the forward side, in the direction from the A-side toward the B-side.

Figure 3A:
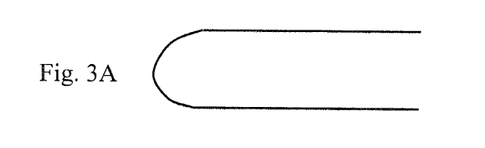
Figure 3B:
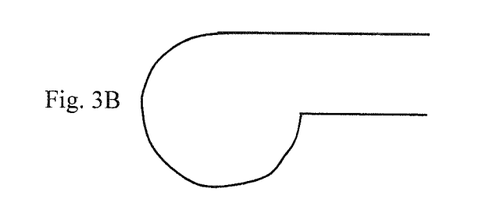

In this embodiment, further, the shape of the deepest end of the slit 9 is curved such that the thickness of the holder 2 between the upper face and the deepest end of the slit 9 is not thinner than the thickness of the holder 2 between the upper face and another position of the slit 9, in a view from the lateral face of the holder 2 on the B-side opposite to the lateral face on the A-side where the insert attaching space 5 is provided. In other words, a portion R of the deepest end of the slit 9 where the column-shaped groove 20 is not located is formed as a curved surface that keeps the thickness of the upper jaw 7 from being reduced, as shown in FIGS. 3A and 3B. To be more detailed, the curved surface is not located at an upper position of the top of the slit 9, but located either at the same level as the lower face of the upper jaw 7 as shown in FIG. 3A, or at a lower position than the lower face of the upper jaw 7 as shown in FIG. 3B. Such a configuration prevents appearance of a crack at terminal end portions of the upper jaw 7 and the lower jaw 8 in the vicinity of the deepest end of the slit 9, and also increases the rigidity of the holder 2 so as to suppress chattering.

In general, the holder 2 is formed of an alloy steel. In this case, it is preferable to set the thickness t of a thinnest portion of the holder 2 between the upper face thereof and the column-shaped groove 20, i.e., a thinnest portion of the upper jaw connecting portion 11, to 1 to 3 mm, because such a thickness range optimizes the rigidity of the upper jaw connecting portion 11 and allows the upper jaw 7 to be properly warped. As a result, occurrence of chattering can be suppressed during the cutting work, and the upper jaw 7 can be made to warp by tightening the screw 13 with human power, so as to firmly fasten the insert 30.

Figure 2B:
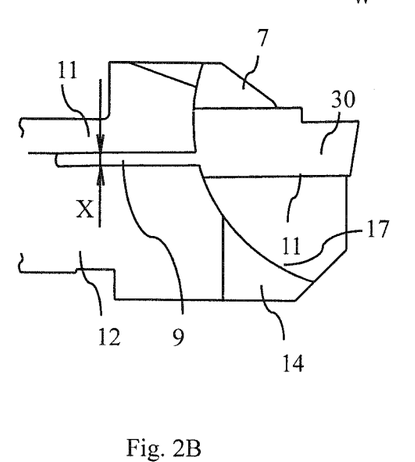
Figure 2C:
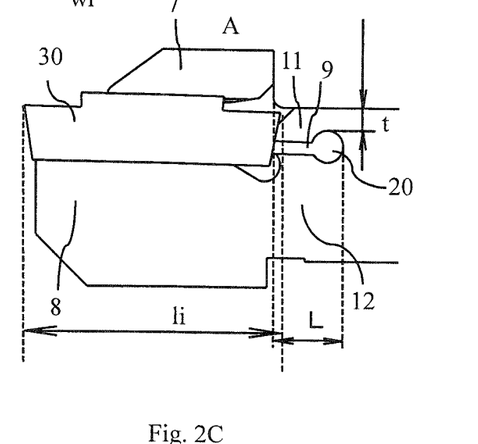
FIG. 2C is a side view from the side of the insert attaching space (A-side in FIG. 2A), respectively showing the cutting tool shown in FIGS. 1A and 1B.

Further, the upper clamp surface 18 of the upper jaw 7 to be abutted against the insert 30, and the lower clamp surface 19 of the lower jaw 8 to be abutted against the insert 30 each include a recessed groove or a projection (in this embodiment, a projection protruding into the insert attaching space 5 as shown in FIGS. 2A to 2C) extending in parallel from the front end portion toward the rear portion. In addition, as will be subsequently described, the insert 30 includes a projection or a recessed groove (in this embodiment, a recessed groove to be fitted with the projection on the lower clamp surface 19, as shown in FIGS. 2A to 2C) formed at the position corresponding to the recessed groove or projection on the upper and lower clamp surfaces, so that positional shift of the insert 30 can be prevented and greater binding force can be applied to the insert 30. As shown in FIGS. 1A, 1B and FIGS. 2A to 2C, further, the lower jaw fixing portion 14 of the lower jaw 7, located by the side of the insert 30, includes a lower jaw adjacent portion 17 formed by cutting away a part of the lower jaw fixing portion 14, so as to secure a clearance for avoiding interference with a work material.

Figure 4A:
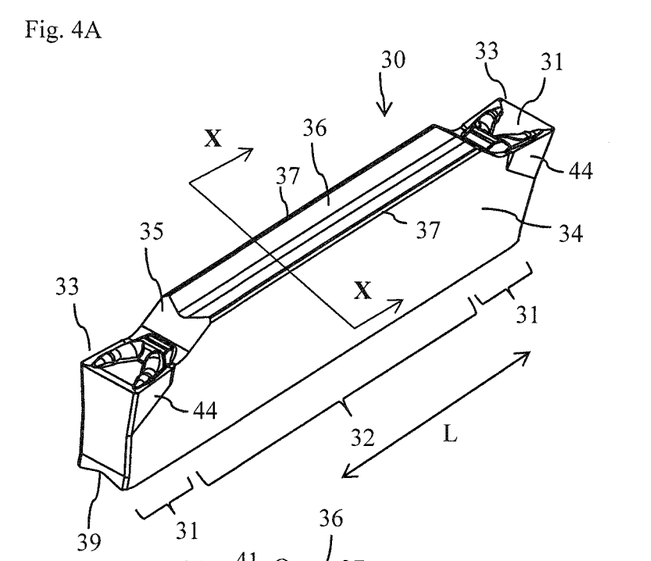
FIG. 4A is a schematic perspective view and FIG. 4B is a cross-sectional view taken along a line X-X in FIG. 4A, respectively showing an example of a cutting insert of the cutting tool according to a preferred embodiment of the present invention.
Figure 4B:
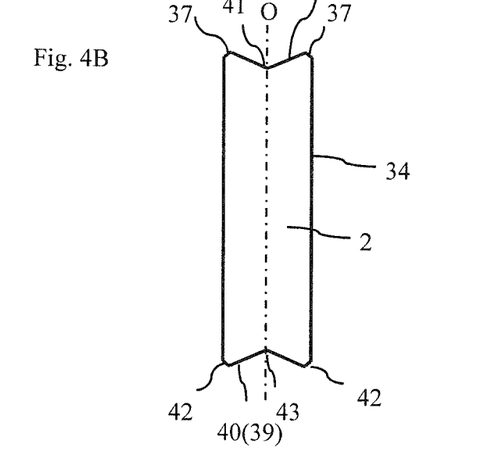

FIGS. 4A and 4B illustrate an example of the insert 30 to be attached to the holder shown in FIGS. 1A, 1B and FIGS. 2A to 2C. As shown in FIGS. 4A and 4B, the insert 30 includes a generally square bar-shaped insert main body 32 and a blade portion 31 provided on an end portion of the insert main body 32 in the longitudinal direction L, and in this embodiment the blade portion 31 is provided on each of the end portions of the insert main body 32. The insert 30 has a generally square bar shape as a whole, so-called dog bone shape, and the insert main body 32 has a constant width in the longitudinal direction and the lateral faces 34 are perpendicular to the width direction of the insert 30. The blade portion 31 has a generally trapezoidal shape in a front view, the top side being wider than the bottom side. In other words, the lateral faces 44 of the blade portion 31 are inclined, such that the cutting edge 33 of the blade portion 31 is formed with a positive clearance angle. In addition, the insert 30 is symmetric with respect to the center line O in the width direction.

As shown in FIGS. 4A and 4B, the insert main body 32 includes an elevated portion 35 protruding upward with respect to the blade portion 31, and the elevated portion 35 includes an upper clamp surface 36 extending in the longitudinal direction and recessed in a V-shape along the central portion in a cross-sectional view taken perpendicularly to the longitudinal direction. In this embodiment, as shown in FIG. 4B, the insert main body 32 includes a lower clamp surface 40 formed on an setting surface 39 opposite to the upper clamp surface 36 and having a central portion recessed in a V-shape, i.e., having a lower central bottom surface 43 recessed upward. When the insert 30 is fixed, the upper clamp surface 36 of the insert 30 and the upper clamp surface 18 of the holder 2 are fitted to each other, and the lower clamp surface 40 of the insert 30 and the lower clamp surface 19 of the holder 2 are fitted to each other.

Figure 5A:
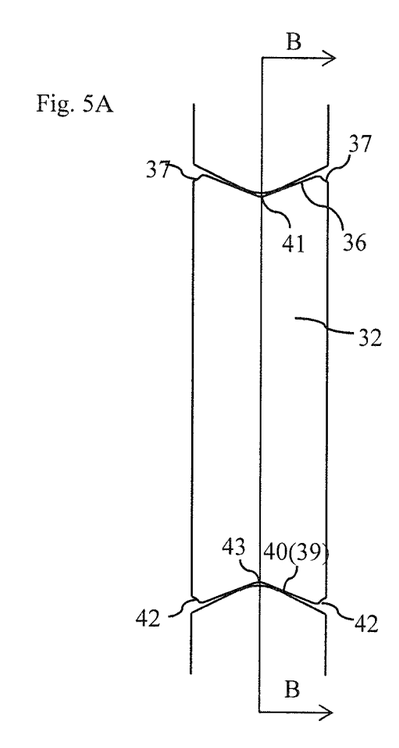
FIG. 5A is an enlarged cross-sectional view showing a portion in the cutting tool shown in FIGS. 1A and 1B where the cutting insert is fastened.
Figure 5B:
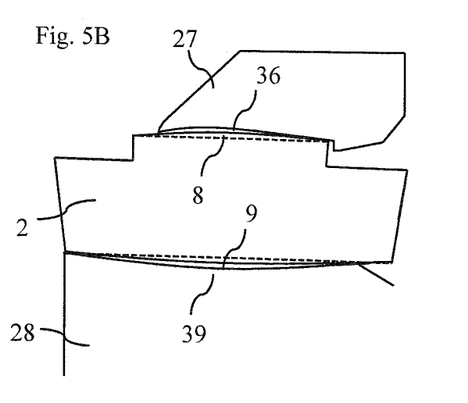
FIG. 5B is a side view of FIG. 5A from a lateral face.

Referring now to FIGS. 5A and 5B, in this embodiment at least one of the upper clamp surface 36 and the lower clamp surface 40 of the insert 30 is formed in a curved shape in which the central portion protrudes toward the insert attaching space 5 in a side view of the holder 2. Such a configuration allows the binding force to be uniformly applied to the insert 30 in the longitudinal direction, thereby further stabilizing the fastening status of the insert 30.

Figure 6A:
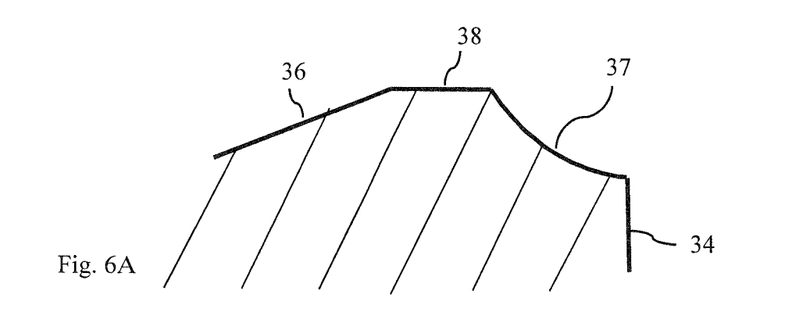
FIGS. 6A and 6B are enlarged cross-sectional views for explaining an example and another example respectively, of a shape of end portions of an elevated portion of the cutting insert shown in FIGS. 4A and 4B.
Figure 6B:
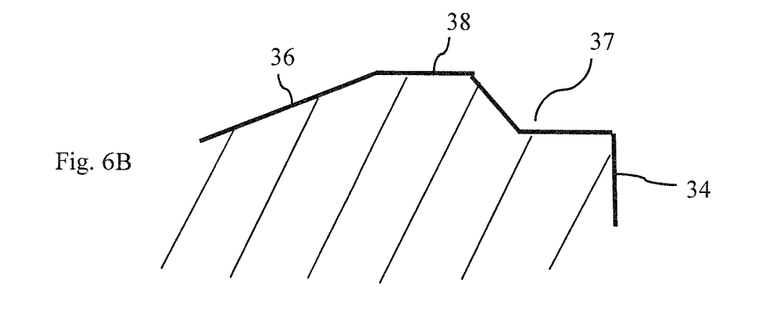
Figure 7A:
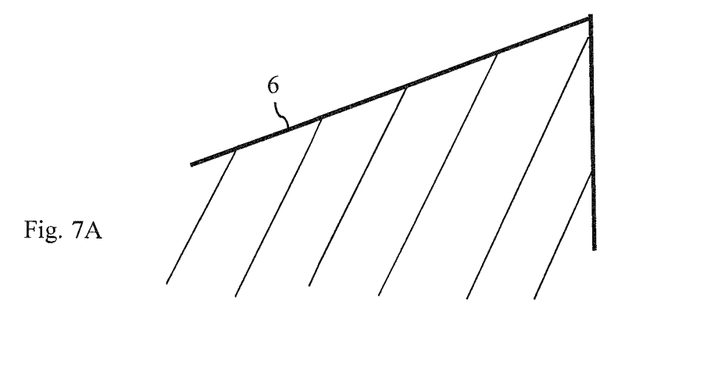
FIGS. 7A, 7B, and 7C are enlarged cross-sectional views for explaining an example, another example, and still another example respectively, of a shape of end portions of an elevated portion of a conventional cutting insert.
Figure 7B:
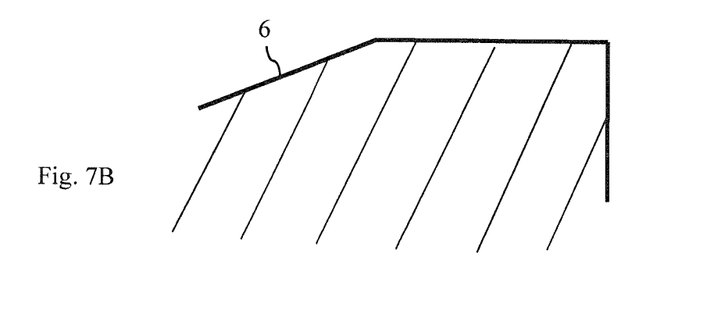

In this embodiment, further, each of the outermost end portions (hereinafter, outer end portions) 37 of the elevated portion 35, located on the outer side of the end portion of the upper clamp surface 36 in the direction perpendicular to the longitudinal direction L, is formed in a concave shape in a cross-sectional view taken perpendicularly to the longitudinal direction L, as shown in FIG. 4B, FIGS. 6A and 6B. Such a configuration suppresses appearance of burrs, which are prone to appear on the outer end portions 37, in the molding process of the insert 30. As a result, degradation in dimensional accuracy of the insert 30 can be prevented, and also occurrence of chipping on the outer end portions 37 can be suppressed. In the case where the outer end portions 37 of the upper clamp surface 50 is formed in a flat chamfered surface as a conventional example shown in FIG. 7C, the portion of the die for molding the insert 30 corresponding to the outer end portions is formed with a sharply pointed shape, and the pointed tip portion is prone to suffer chipping. In contrast, in the insert 30 according to the present invention the outer end portions 37 of the elevated portion are formed in a concave shape, which eliminates the need to form the die for the outer end portions in a sharply pointed shape, and thereby prevents chipping of the die. In addition, the outer end portions 37 formed as above are less likely to suffer chipping when hit by cut scrapes, compared with the shapes shown in FIGS. 7A and 7B. Although a flat portion 38 is provided between the upper clamp surface 36 and the outer end portions 37 in FIGS. 6A and 6B, the flat portion 38 may be excluded. In this embodiment, the width of the outer end portions 37 of the concave shape is 0.05 to 0.2 mm.

In the present invention, the direction in which the insert 30 is held by the holder 2 is defined as up-down direction, and the side of the blade portion 31 on which the cutting edge is provided is defined as upper side.

The cross-sectional shape of the outer end portions 37 taken perpendicularly to the longitudinal direction L may be a combination of a chamfered surface and a flat surface formed on the respective sides of the central portion as shown in FIG. 6B, however it is more preferable to form the outer end portions 37 in a concave curved surface as shown in FIG. 6A. The outer end portions 37 of the concave curved shape is even less likely to suffer chipping when hit by cut scrapes. In addition, the cutting fluid flows over the blade portion 31 without forming a turbulent flow, and hence the cutting fluid can be smoothly supplied. In this embodiment, the curvature radius of the curved surface is 0.05 to 0.4 mm.

Further, as shown in FIG. 4B and FIG. 5A, each of the outer end portions 42 of the setting surface 39, located on the outer side of the end portion of the lower clamp surface 40 in the direction perpendicular to the longitudinal direction L, is formed in a concave shape in a cross-sectional view taken perpendicularly to the longitudinal direction L, like the outer end portions 37. Such a configuration suppresses appearance of burrs, which are prone to appear on the setting surface 39, in the molding process of the setting surface 39. In addition, the die for the lower clamp surface 40 does not have to be formed in a sharply pointed shape, and therefore chipping of the die can be prevented.

Although the embodiment of the present invention has been described as above, the present invention is in no way limited to the foregoing embodiment. It is a matter of course that the present invention may be modified as desired without departing from the scope of the present invention.

Example 1

Inserts specified below were attached to holders made of an alloy steel and formed in the shape shown in FIGS. 1A, 1B and FIGS. 2A to 2C in the following dimensions, and performance was evaluated.

<Holder>
Width W in a front view: 12 mm
Height H in a front view: 18.5 mm
Height of upper jaw: 4 mm
Width w of upper jaw and lower jaw: 1.7 mm
Distance L between rear end of upper jaw and column-shaped groove: 6 mm
Column-shaped groove (diameter of column-shaped groove, ratio of length of column-shaped groove to width of holder perpendicular to longitudinal direction, and thickness of thinnest portion of upper jaw (thickness of upper jaw above column-shaped groove)): See Table 1

Central position of through hole (ratio of distance from lateral face of column-shaped groove on insert attaching space side to entire length of through hole): See "Through hole position" in Table 1

The deepest end portion of the slit where the column-shaped groove is not provided was formed in an arcuate shape.

Thickness X of slit: 1 mm

<Insert>
Shape: Insert GMM2020R-MT-15D from KYOCERA Corporation
Width wi: 2 mm
Height hi at center in width direction: 4.3 mm (upper and lower central portion recessed in V-shape in a cross-sectional view)
Length li: 20 mm (specimen No. 12 has curved lower clamp surface with central portion protruding by 0.05 mm in a side view parallel to longitudinal direction)

Cutting works were performed with the cutting tools specified above under the following conditions, and occurrence of chattering and cutting performance were evaluated.

<Cutting Conditions>
Work material: SK material
Mode: Traversing
Cutting depth: Variable
Feed: 0.3 mm/rev
Environment: Water-soluble cutting fluid used
Evaluation: Cutting was performed over a length of 10 mm to different cutting depths, and the depth at which the insert came off from the holder was measured.

TABLE 1

| | Column-shaped groove | | | | | |
|---|---|---|---|---|---|---|
| Specimen No. | Diameter (mm) | Width (%) | Upper jaw minimum thickness t (mm) | Through hole position | Holding status Cutting status | Cutting performance Cutting depth (mm) |
| I-1 | — | — | 0.8 | — | Chattered | — |
| I-2 | 4.0 | All over (100%) | 1.0 | 54% | Chattered | — |
| I-3 | 3.5 | 75% | 1.0 | 68% | Good | 2.7 |
| I-4 | 3.0 | 65% | 1.5 | 56% | Good | 2.8 |
| I-5 | 2.0 | 40% | 3.0 | 40% | Good | 2.3 |
| I-6 | 2.0 | 50% | 2.0 | 45% | Good | 2.5 |
| I-7 | 2.0 | 40% | 1.0 | 82% | Good | 2.4 |
| I-8 | 2.0 | 70% | 2.5 | 80% | Good | 2.5 |
| I-9 | 1.5 | All over (100%) | 2.0 | 50% | Good | 2.0 |
| I-10 | 2.5 | All over (100%) | 3.5 | 53% | Unable to hold | — |
| I-11 | 2.0 | — | 2.0 | — | Good | 2.1 |
| I-12 | 3.0 | 65% | 1.5 | 63% | Good | 3.0 |

As is apparent from Table 1, the specimen No. I-1 without the column-shaped groove incurred chattering and was unable to cut. In the specimen No. I-11 the insert was unstably attached and prone to come off from the holder, and therefore the cutting depth could not be increased. In the specimen No. 2 in which the column-shaped groove is formed so as to penetrate all the way instead of halfway of the width, the insert chattered and was unable to cut. With the specimen No. I-10 the insert was unable to be fastened to the holder with a screw, and with the specimen No. I-9 the insert was unstably attached and prone to come off from the holder, and therefore the cutting depth could not be increased.

In contrast, with the specimens No. I-3 to 8, and 12, in which the upper jaw connecting portion was formed with a reduced thickness, and the column-shaped groove was formed so as to extend in the direction perpendicular to the longitudinal direction from the lateral face on the side of the insert attaching space, only halfway along the deepest end of the slit instead of penetrating as far as the opposite lateral face, the insert was firmly fastened to the holder and occurrence of chattering was suppressed.

Example 2

Inserts in which the outer end portions of the elevated portion were formed as specified in Table 2 were formed in the following dimensions, and the life span of the die and burr appearance after sintering were evaluated upon making up the compacts. The width of the outer end portions was set to 0.1 mm. The curvature radius of the specimen No. II-1 was set to 0.1 mm. In addition, inserts were attached to holders formed in the shape shown in FIGS. 1A, 1B and FIGS. 2A to 2C in the following dimensions, and chipping status and cutting performance was evaluated under the following cutting conditions. The results are shown in Table 2.

Figure 7C:
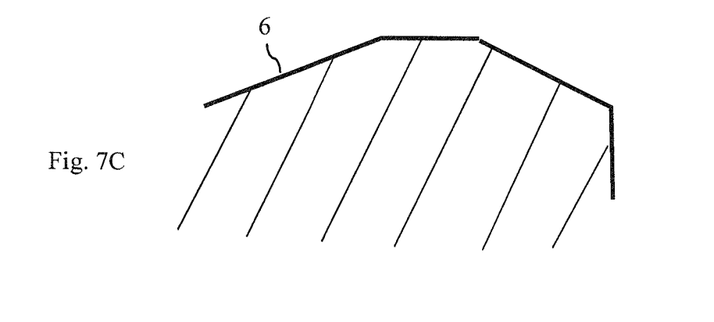

<Insert>
Shape: Insert GDM2020N-010PQ from KYOCERA Corporation
Width wi: 2 mm
Height hi at center in width direction: 4.3 mm (length between upper central bottom portion and lower central bottom portion)
Length li: 20 mm <Holder>
Width W in a front view: 12 mm
Height H in a front view: 18.5 mm
Height h of upper jaw: 4 mm
Width w of upper jaw and lower jaw: 1.7 mm
Distance L between rear end of upper jaw and column-shaped groove: 6 mm
Column-shaped groove (diameter of column-shaped groove: 3 mm, ratio of length of column-shaped groove to width of holder perpendicular to longitudinal direction: 65%, thickness t of thinnest portion of upper jaw (thickness of upper jaw above column-shaped groove): 1.5 mm)
Thickness X of slit: 1 mm <Cutting Conditions>
Work material: S45C
Mode: Cut-off
Feed: 0.05 mm/rev
Environment: Oil-based cutting fluid used As is apparent from Table 2, with the specimen No. II-3 in which the outer end portions of the elevated portion was formed as an extension of the upper clamp surface shown in FIG. 7A so as to define an acute angle with respect to the lateral face, and with the specimen No. II-4 in which the outer end portions of the elevated portion was formed as a horizontal surface parallel to the width direction of the insert shown in FIG. 7B, burrs appeared on the outer end portions of the elevated portion in the molding process of the insert, and thus occurred dimensional errors. With the specimen No. II-5 in which the outer end portions was formed as a flat chamfered surface as shown in FIG. 7C, the die for molding the insert was prone to suffer chipping.

In contrast, with the specimens No. II-1 and 2 in which the outer end portions of the elevated portion were formed in a concave shape as shown in FIGS. 6A and 6B, the formation performance was good and appearance of burrs could be suppressed. In particular, with the specimen No. II-1 in which the outer end portions of the elevated portion were formed in a concave curved surface as shown in FIG. 6A, the outer end portions of the elevated portion could be prevented from being chipped during the cutting work, and the cutting fluid was smoothly supplied and the cutting length was extended.

REFERENCE SIGNS LIST

1 Cutting tool (throwaway cutting tool)
2 Holder (holder for grooving work)
3 Shank portion
4 Head portion
5 Insert attaching space
7 Upper jaw
8 Lower jaw
9 Slit
10 Upper jaw fixing portion
11 Upper jaw connecting portion
12 Lower jaw connecting portion
13 Screw
14 Lower jaw fixing portion
15 Through hole
17 Lower jaw adjacent portion
18 Upper clamp surface
19 Lower clamp surface
20 Column-shaped groove
30 Insert

The invention claimed is:
1. A holder comprising:
a generally bar-shaped shank portion and a head portion located on a front end side of the shank portion and integrally formed therewith,
the head portion including:
an upper face,
a first lateral face,
a second lateral face opposite to the first lateral face,
an insert attaching space provided on a front end of the first lateral face, an upper jaw and a lower jaw respectively located above and below the insert attaching space, a slit extending backward from the insert attaching space, an upper jaw connecting portion and a lower jaw connecting portion divided by the slit, an upper clamp surface of the upper jaw opposed to the insert attaching space, a lower clamp surface of the lower jaw opposed to the insert attaching space, and

TABLE 2

| Specimen No. | Shape of End portions of elevated portion | Number of pieces formed | Number of pieces with dimensional defect | Chipping status | Cut length (mm) |
|---|---|---|---|---|---|
|  | FIG. 2A | >10000 | 0/5000 | ○ | 10000 |
| II-1 | FIG. 2B | >10000 | 0/5000 | Δ | 9000 |
| II-2 | FIG. 6A | >10000 | 1/5000 | x | 6000 |
| II-3 | FIG. 6B | >10000 | 1/5000 | x | 7000 |
| II-4 | FIG. 6C | 1000 | 0/5000 | ○ | 7000 | a groove is connected to a rear end of the slit
wherein a thickness between the upper face and the groove is less than a thickness between the upper face and the slit, and
wherein, in a direction perpendicular to a longitudinal direction from a front end to a rear end of the holder, the length of the groove is less than the length of the slit.

2. The holder according to claim 1, further comprising an upper jaw fixing portion connected to the upper jaw and the upper jaw connecting portion, a lower jaw fixing portion connected to the lower jaw and the lower jaw connecting portion, a through hole formed in the upper jaw fixing portion, and a screw hole formed at a position corresponding to the through hole in the upper jaw fixing portion.

3. The holder according to claim 1,
wherein a length of the groove is 50 to 75% of a width of the holder viewed from a front end of the head portion.

4. The holder according to claim 1,
wherein a thickness of between the upper face and the groove is 1 to 3 mm at a thinnest portion.

5. The holder according to claim 1,
wherein a shape of the rear end of the slit is curved so as to make a thickness of between the upper face and the rear end of the slit not thinner than a thickness of between the upper face and another position of the slit, in a view from the lateral face of the holder opposite to the lateral face on the side of the insert attaching space.

6. The holder according to claim 1,
wherein the groove is formed in a circular column shape.

7. The holder according to claim 1,
wherein the groove extends in a direction perpendicular to a longitudinal direction from a front end to a rear end of the holder, in a plan view of the holder.

8. The holder according to claim 2,
wherein the center of the through hole is located at a position corresponding to 45 to 80% of the length of the groove from the lateral face of the holder on the side of the insert attaching space.

9. The holder according to claim 2,
wherein a screw is inserted in the through hole, and the screw is engaged with the screw hole.

10. A cutting tool comprising the holder according to claim 1, and an insert attached to the insert attaching space of the holder.

11. The cutting tool according to claim 10,
wherein at least one of the upper clamp surface of the upper jaw and the lower clamp surface of the lower jaw is formed in a curved shape in which the central portion protrudes toward the insert attaching space, in a side view of the holder.

12. The holder according to claim 1,
wherein the slit extends in said direction beyond the groove.

13. The holder according to claim 1,
wherein the slit extends in said direction beyond the groove in at least a portion not connected to the groove.

14. The holder according to claim 1,
wherein the slit and the groove extends in said direction from the first lateral face, and the slit extends to the second lateral face.

* * * * *